Patented Dec. 19, 1933

1,940,528

UNITED STATES PATENT OFFICE 1,940,528

RUBBER COMPOSITION

Albert Edward Bond, Seven Kings, England, assignor, by direct and mesne assignments, to Rubber Cement Products Limited, London, England, a company of Great Britain No Drawing. Application December 10, 1931, Serial No. 580,229, and in Great Britain December 17, 1930

8 Claims. (Cl. 106—23)

This invention relates to plastic rubber compositions for use in the manufacture of road, pavement, and like surfaces, for use in the manufacture of flat roofs and also for use in the manufacture of such articles as pipes, chemical vessels, tanks, frames of buildings, moulded goods and so forth.

A number of proposals have been made to produce compositions having a rubber basis and including cement, and in particular it has been stated that an ordinary rubber latex is mixable with aluminous cement in all proportions, the substances being said then to combine to form a homogeneous plastic substance or composition which can be spread or laid upon surfaces or moulded into bricks or other articles. So far as we are aware, however, none of the prior proposals have met with any commercial success.

Extensive researches have now shown that in order to make a satisfactory composition it is necessary to employ a concentrated rubber latex or the like and according to the invention a composition consists of a concentrated aqueous dispersion of natural or synthetic rubber and a cement, the latter being present in an amount at least sufficient to cause the dispersion to set or gel irreversibly.

The term "a concentrated aqueous dispersion of natural or synthetic rubber" is intended to include a concentrated rubber latex (either natural, or preserved, or vulcanized in its concentrated condition), an aqueous dispersion or crude or vulcanized rubber (either reclaimed or virgin), an aqueous dispersion manufactured by chemical synthesis from such substances as isoprene, butadiene and their homologues, and other like dispersions, but only those dispersions in which the rubber constitutes the discontinuous phase, and in which the dry rubber content is at least 60% by weight of the total dispersion. The best results are obtained when the dry rubber or equivalent content of the latex is about 2.6 times the liquid content of the latex.

The composition may also contain fillers, vulcanizing agents, accelerators and anti-oxidizing agents if desired. Instead of a cement containing a substantial proportion of alumina, a Portland, blast furnace or other cement may be used, but in this case a stabilizer must also be included in sufficient quantity to prevent premature coagulation of the dispersion.

It is to be understood that the cements are usually added in the ordinary commercial form and do not require particularly fine grinding. In fact the invention is not concerned with cements wholly in a colloidal or similarly finely divided state and the use of such dispersed or finely divided cements is not claimed because they would make the process so expensive as to be of no practical utility.

In general the action of the cement is to combine with the liquid part of the dispersion, and it is found that when an ordinary unconcentrated rubber latex is used such a quantity of cement or fillers has to be present to effect the combination completely that the quantity of rubber in the final composition is not high enough to give a plastic composition of the nature of a rubber compound but only what may be regarded as a wholly unresilient and weak rubberized cement. Furthermore, when large quantities of the majority of cements are added to an unconcentrated latex, it is exceedingly difficult to avoid premature coagulation of the rubber. This coagulation leads in turn to inability to obtain proper dispersion of the rubber throughout the cement, because the lumps thus formed are liable to settle out during the mixing. By using a concentrated rubber dispersion as above defined, however, all these disadvantages of the prior compositions are avoided, provided, of course, that a stabilizer is added if necessary as set forth above.

The choice of fillers for incorporation in the mix is determined entirely by the purpose to which the composition is to be put as the filler will, of course, have a determinable effect on the strength and other physical qualities of the finished product. The maximum amount of cement that can be added to the dispersion is governed by the desired rubber content of the final composition and by the fact that the composition must be in the form of a paste when it is to be used or laid.

The amount and nature of the stabilizer used depends, of course, on the amount and nature of the filling materials, and where possible the latter will be chosen so as to reduce the amount of the former to a minimum.

If an unvulcanized dispersion is used and it is desirable that the composition should be vulcanized, a vulcanizing agent such as powdered sulphur with or without an accelerator may be added to the mix. In addition, an accelerator activator, such as is sold under the trade name "Barak", may be added with or without an anti-oxidizing agent, such for example as the substance known in the trade as "agerite".

Vulcanization is not found absolutely essential where the composition is to be used solely for such purposes as the manufacture of containers for dilute acids and alkalies or where the temperatures to be dealt with do not exceed 80° C. For such purposes it has been found that a crude unvulcanized relatively soft rubber composition gives sufficient protection. The vulcanization can be carried out by adding the necessary super-accelerators, activators and the like to the composition in addition to such amounts of sulphur as are necessary to obtain the desired resistance of the final substance. Such compositions can either be vulcanized by the use of hot or boiling water or steam or hot air at temperature around 100° C., but in the case of relatively soft rubber compounds satisfactory vulcanization can be carried out at normal atmospheric temperatures.

It is found that the concentration of the dispersion used may have an important bearing on the properties of the final composition and it is in fact found that best results are obtained when the dry rubber or equivalent content of the latex is about 2.6 times the liquid content of the latex and that in any case the dry rubber content must be higher than the water content.

In order that the invention may be clearly understood and readily carried into effect, some examples of suitable compositions in accordance therewith will now be given.

When the composition is to be used for such purposes as lining vessels to render them acid proof the rubber content of the dry composition should be at least 50% by weight. The actual percentage will, of course, depend upon the strength of the acid. For protection against fairly dilute acids the following mix may be employed.

208 oz. of concentrated rubber latex containing 160 oz. of dry rubber.
2 oz. of the stabilizer known in the trade as "Saprotin" preferably in the form of a 30% solution.
6.4 oz. of powdered sulphur.
3.2 oz. of zinc oxide.
1.6 oz. of "Vulcazit 576".
8 oz. of coarse asbestos fibre.
6.4 oz. of carbon black.
60 oz. of Portland cement.

This composition would also be suitable for works floorings and similar purposes.

Where protection against stronger acids is required then the amount of cement should be reduced.

The above composition is relatively soft, but its hardness can be increased by increasing the amount of cement. In general it may be said that according to the amount of cement used a relatively soft composition suitable for such applications as the lining of tanks or a relatively hard composition suitable for use on road and like applications, can be obtained. It is found that the harder compositions require an amount of cement which is at least 150% by weight of the liquid content of the dispersion. In the following examples, some typical mixes of the harder compositions are given.

For road surfacing purposes the rubber content of the composition need not be very high, and accordingly the following may be taken as a typical mix:—

208 oz. concentrated rubber latex containing about 152 oz. of dry rubber.
2 oz. of the stabilizer sold under the trade name "Saprotin" which is prefereably added in the form of a 30% solution.
6.4 oz. powdered sulphur.
3.2 oz. zinc oxide.
1.6 oz. "Vulcazit 576".
8 oz. coarse asbestos fibre.
8 oz. carbon black.
118.4 oz. alumina cement.

It will be seen from the above proportions that the cement is added in an amount which is more than 150% by weight of the liquid content of the latex. This mix gives a relatively soft product and if a harder product is required the following mix may be used.

208 oz. concentrated rubber latex containing 152 oz. of dry rubber.
2 oz. of the stabilizer sold under the trade name "Saprotin" which is preferably added in the form of a 30% solution.
6.4 oz. powdered sulphur.
3.2 oz. zinc oxide.
2 oz. tetra-methyl-thiuram-disulphide.
6.4 oz. lamp black.
90 oz. alumina cement.
45 oz. coarse asbestos fibre.
45 oz. ground silica or sand, split or the like.

A still harder product which is suitable for the surfacing of roads which are subject to very heavy loads can be made by means of the following mix.

208 oz. "Revertex".
5 oz. of the stabilizer sold under the trade name "Saprotin" which is preferably added in the form of a 30% solution.
2 oz. of "Vulcazit P".
6.4 oz. sulphur.
3.2 oz. zinc oxide.
6.4 oz. carbon black.
90 oz. sand.
320 oz. cement.

The hardness of the mix can always be increased by the addition of suitable fillers and an extraordinarily hard road material can be made by increasing the amount of sand used in the last example to 270 oz.

These compositions may be laid to form a road surface or foundation by simply spreading them and allowing them to set in situ. It is preferred to spread them in a single layer of the finally required thickness although they may quite well be laid in a number of superimposed layers. The latter method may, however, introduce difficulties because there is always the danger that the upper surface of each layer may be somewhat overset and, therefore, may reduce the strength of the bond between successive layers. In order to withstand the loads to which a road is usually subjected, a minimum thickness of 1 cm. is required and it has been found that the composition can be laid quite easily in single layers which are as much as 5 cm. thick.

In order to avoid any risk of premature coagulation of the rubber, it is desirable when using Portland cement to delay the compounding until just before the composition is to be used. With this same object in view, the cement should be added in small quantities to the concentrated latex, while the mixture is kept constantly stirred before the other ingredients are added. If this is done the latter can be added without fear of prematurely coagulating the rubber. The above procedure represents the safest course to adopt with all cements, but it is worthy of note that less care is necessary when using aluminous cement than with many other cements.

In addition to being suitable for making acid proof vessels and the like, this composition could be used for works floorings and similar purposes. In this connection is is especially useful in cases where acids and alkalies are being handled on a fairly large scale, for instance in chemical workshops and laboratories.

Where the composition is to be used for road sufacing, bituminous or asphaltic road making materials in solid or liquid form or in the form of an aqueous emulsion of bitumen or asphalt or the like may also be incorporated. Liquid tar and basalt split are particularly good materials for this purpose. The resilience of the dry composition coupled with its strength makes it a valuable road surfacing material and among its many advantages special stress may be laid on the fact that, unlike most rubber compositions hitherto tried for this purpose, it will not spew to any extent at the edges under the influence of the heat or pressure that it is likely to be subjected to. Other very important advantages are that the resilience of the composition reduces shocks to a minimum and deadens sound to a remarkable extent. Again such a road surface is absolutely non-dusting and reduces the danger of skidding to a minimum.

The composition is found to set and reach its maximum strength in from 48-96 hours, and this is also a valuable asset in road and flooring construction. If it is desired to shorten this time still further, the vulcanization of the rubber in the composition may be hastened by the simple expedient of passing a hot roller over it as soon as its consistency will allow this to be done.

Besides being an excellent material for paving, roofing and surfacing, its resilience and great adherence allow the composition to be used most successfully as a jointing material in highway construction. For instance, it may be used for bedding down granite sets and in this connection its resilience is of the greatest importance, because a highway constructed in this way is provided with a surface having excellent wearing qualities and at the same time is relieved of the objectionable hardness usually associated with granite sets. Again the composition is an eminently useful material for bedding down tramway rails or for expansion joints between concrete bays and, of course, can also be laid on road foundations so as to support concrete rafts and give them a resilience they would not otherwise possess.

The composition may if desired be laid on wire or other meshing of appropriate strength, for reinforcing purposes.

The composition can, of course, also be used for pipes and pipes or vessels of circular cross-section may be constructed centrifugally. Again, it can also be used for the walls of buildings and in this connection it should be noted that it is a particularly appropriate material for high tension transformer buildings and similar buildings. For this purpose, the skeleton of the building may first be made of expanded metal or any suitable meshing and composition then be plastered on to cover the metal and fill the interstices. For larger buildings the frame of the building may be made of steel sections in the ordinary way and the bays thus formed be filled in as described above.

The material may also be used for manufacturing chemical apparatus such as baths and sinks, and if a more pleasing colour than the natural greyish colour of the composition is desired, appropriate pigments may be incorporated in the mix. In this connection it is worthy of note that if cements such as are sold under the trade name "Snowcrete" or "Atlas" are used, an almost pure white product is obtained.

Yet again the novel composition may be used for moulding purposes and articles such as tiles, slabs and toys may be made in this way.

The composition being plastic can be laid with the greatest ease. No skilled labour or expensive tools are required. In fact, for small jobs, the only tool required is a trowel and for large jobs an ordinary shovel is quite adequate. The mixing of the composition is also a very simple procedure requiring no special plant.

I claim:

1. A plastic composition consisting of a concentrated aqueous dispersion of natural or synthetic rubber and a quantity of cement at least sufficient to cause said dispersion to set or gel irreversibly.

2. A plastic composition consisting of a concentrated aqueous dispersion of natural or synthetic rubber and a quantity of cement at least equal in weight to the weight of the liquid content of said dispersion.

3. A plastic composition consisting of a concentrated aqueous dispersion of natural or synthetic rubber and a quantity of aluminous cement at least sufficient to cause said dispersion to set or gel irreversibly.

4. A plastic composition consisting of a concentrated aqueous dispersion of natural or synthetic rubber and a quantity of Portland cement a least sufficient to cause said dispersion to set or gel irreversibly and a stabilizer in an amount sufficient to prevent premature coagulation of said dispersion.

5. A plastic composition consisting of a concentrated aqueous dispersion of natural or synthetic rubber and a quantity of cement containing a substantial proportion of alumina amounting to at least 150% by weight of the liquid content of said dispersion.

6. A plastic composition consisting of a concentrated aqueous dispersion of natural or synthetic rubber and a quantity of Portland cement amounting to at least 150% by weight of the liquid content of said dispersion and a stabilizer in an amount sufficient to prevent premature coagulation of said dispersion.

7. A plastic composition consisting of a concentrated aqueous dispersion of natural or synthetic rubber and a quantity of blast furnace cement amounting to at least 150% by weight of the liquid content of said dispersion and a stabilizer in an amount sufficient to prevent premature coagulation of said dispersion.

8. A plastic composition consisting of a concentrated aqueous dispersion of natural or synthetic rubber and a quantity of cement at least sufficient to cause said dispersion to set or gel irreversibly and a vulcanizing agent.

ALBERT EDWARD BOND.